US012294583B2

(12) United States Patent
Pateriya

(10) Patent No.: US 12,294,583 B2
(45) Date of Patent: May 6, 2025

(54) AUTHORIZATION SCOPE MANAGEMENT FOR LOW-CODE PROGRAMMING ENVIRONMENTS

(71) Applicant: Cisco Technology, Inc., San Jose, CA (US)

(72) Inventor: Neelesh Pateriya, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 315 days.

(21) Appl. No.: 17/479,182

(22) Filed: Sep. 20, 2021

(65) Prior Publication Data

US 2023/0093122 A1 Mar. 23, 2023

(51) Int. Cl.
*H04L 9/40* (2022.01)
*G06F 8/34* (2018.01)

(52) U.S. Cl.
CPC .............. *H04L 63/102* (2013.01); *G06F 8/34* (2013.01); *H04L 63/062* (2013.01)

(58) Field of Classification Search
CPC ........ H04L 63/102; H04L 63/062; G06F 8/34
See application file for complete search history.

(56) References Cited

U.S. PATENT DOCUMENTS 7,770,150 B2* 8/2010 Feng ...................... G06F 9/445 709/219
7,853,961 B2 12/2010 Nori et al.
9,569,596 B2 2/2017 Marcus et al.
10,469,480 B2 11/2019 Kumar et al.
10,764,254 B2 9/2020 Ford et al.
2007/0283423 A1 12/2007 Bradley et al.
2012/0167158 A1* 6/2012 Leach .................. G06F 21/604 726/21
2016/0182487 A1* 6/2016 Zhu ...................... H04L 63/083 726/9
2016/0378437 A1* 12/2016 Patino-Bueno ....... G06F 3/0484 717/105
2018/0211056 A1* 7/2018 Delisser .............. G06F 21/6218
2018/0321915 A1* 11/2018 Patino-Bueno ........... G06F 8/36
2019/0102525 A1* 4/2019 Vaishnav ............ G06F 12/0891
2019/0166117 A1 5/2019 Kumar et al.

OTHER PUBLICATIONS

Vacher, Remi, "Automated Remediation with SecureX for Secure Cloud Analytics and AWS IAM", online: https://github.com/vacheremi63/SecureX, accessed Aug. 11, 2021, 6 pages, Github.com.

(Continued)

*Primary Examiner* — Jung W Kim
*Assistant Examiner* — Alan L Kong
(74) *Attorney, Agent, or Firm* — BEHMKE INNOVATION GROUP LLC; James M. Behmke; James J. Wong

(57) ABSTRACT

In one embodiment, a device receives a set of actions for a low-code workflow specified via a user interface. The device determines authorization scopes for targets of the set of actions. The device compares the authorization scopes for the targets to authorization scopes needed for the set of actions. The device provides, to the user interface, an excessive authorization notification, when the authorization scopes for the targets exceed the authorization scopes needed for the set of actions.

18 Claims, 7 Drawing Sheets

(56) References Cited

OTHER PUBLICATIONS

"Using the VMware vRealize Orchestrator Client", online: https://docs.vmware.com/en/vRealize-Orchestrator/8.4/vrealize-orchestrator-84-using-client-guide.pdf, Apr. 15, 2021, 72 pages, VMware, Inc.
Atluri, et al., "Security for Workflow Systems", Handbook of Database Security: Applications and Trends, Mar. 2007, 11 pages, Springer.
"Security Best Practices in IAM", online: https://docs.aws.amazon.com/IAM/latest/UserGuide/best-practices.html, AWS Identity and Access Management User Guide, accessed Aug. 11, 2021, 9 pages, Amazon Web Services, Inc.
"Cloud and Network Management", online: https://www.cisco.com/c/en/us/products/cloud-systems-management/index.html#~featured-products, accessed Aug. 11, 2021, 12 pages, Cisco.com.

* cited by examiner

AUTHORIZATION SCOPE MANAGEMENT FOR LOW-CODE PROGRAMMING ENVIRONMENTS

TECHNICAL FIELD

The present disclosure relates generally to computer networks, and, more particularly, to authorization scope management for low-code programming environments.

BACKGROUND

The creation of models, ontologies, diagrams, software programs, and other similar artifacts remains a very time consuming and resource intensive activity. Recently, efforts have focused on simplifying programming environments by representing portions of code in a visual manner. In doing so, highly-skilled programmers are no longer needed to write many lines of code, to create a program. Instead, a simplified programming environment may be such that even a non-technical user is able to create programs by manipulating a graphical user interface (GUI). Indeed, the promise of drag-and-drop functionality in a programming environment greatly simplifies the programming process in a manner that would allow non-technical users to build software applications. These types of programming environments are often referred to as "low-code" environments.

Typically, authorization management in low-code environments is left to the programmer. For instance, a programmer in a low-code environment may configure access keys to be used by the program during execution to access different online services. However, there is the tendency of non-technical users to misconfigure the amount of authorization granted to a low-code program, often granting more privileges than needed, so long as the program 'works.'

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
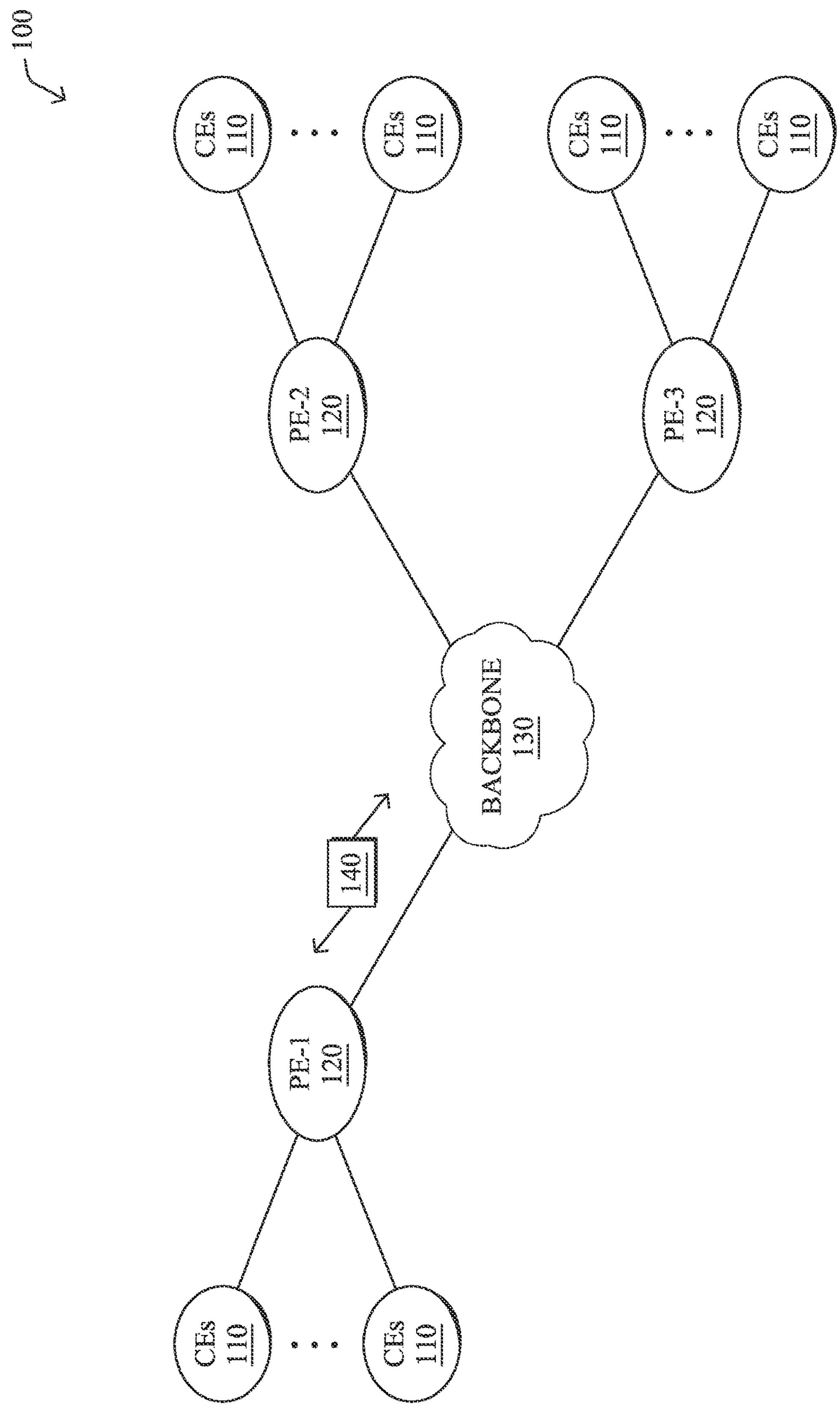
FIGS. 1A-1B illustrate an example computer network.

According to one or more embodiments of the disclosure, a device receives a set of actions for a low-code workflow specified via a user interface. The device determines authorization scopes for targets of the set of actions. The device compares the authorization scopes for the targets to authorization scopes needed for the set of actions. The device provides, to the user interface, an excessive authorization notification, when the authorization scopes for the targets exceed the authorization scopes needed for the set of actions.

DESCRIPTION

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
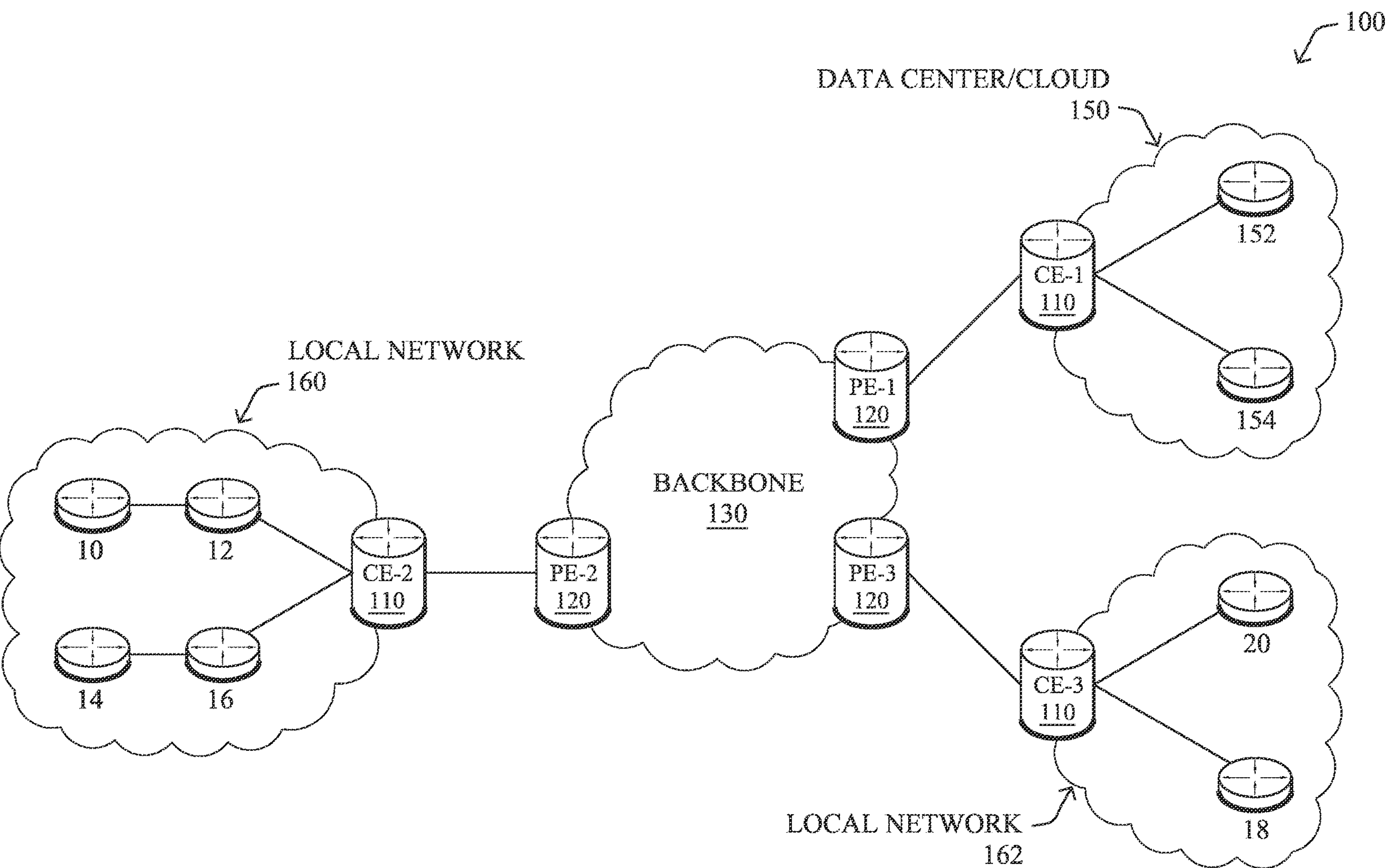

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include nodes/devices 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
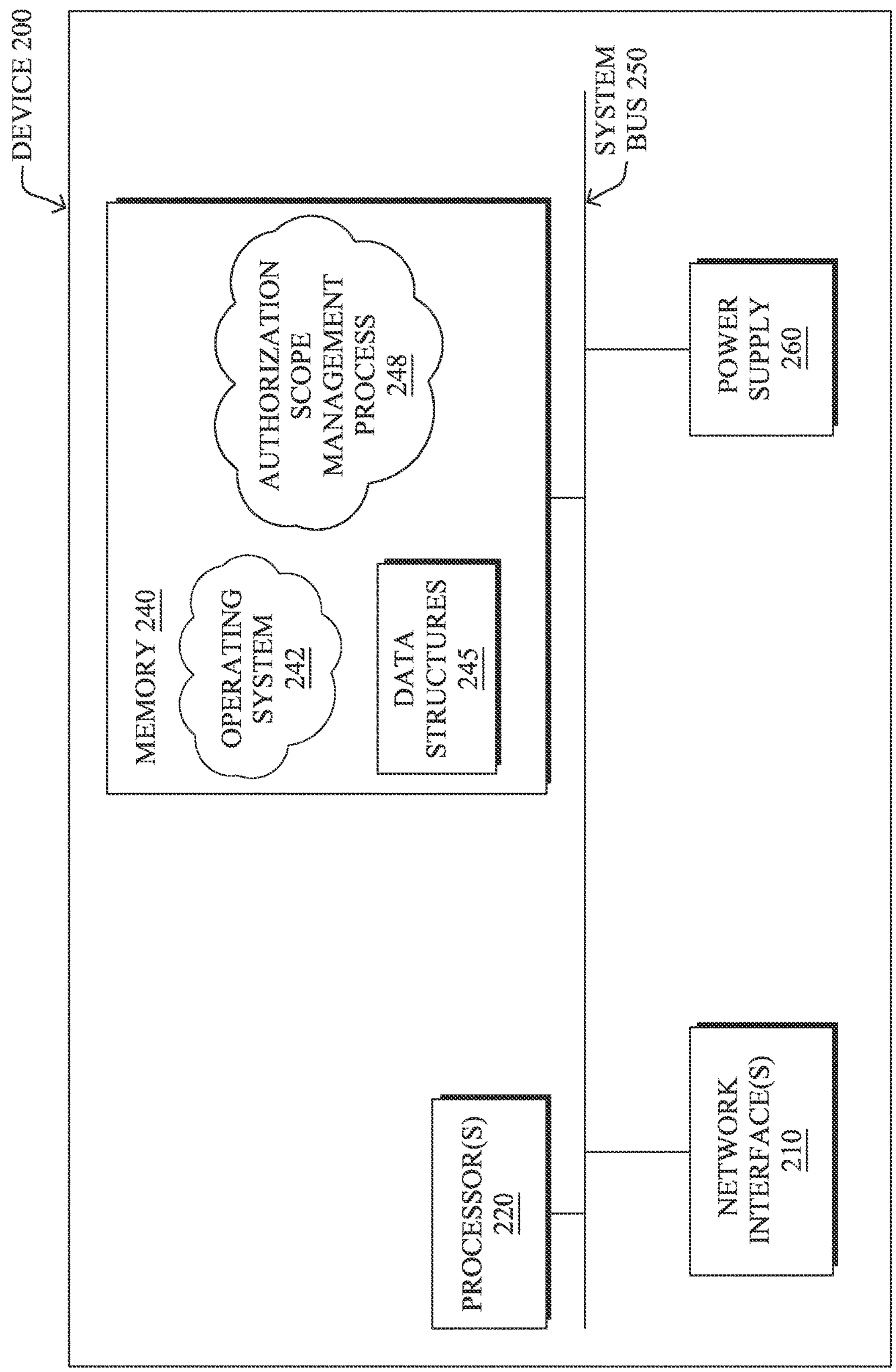
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/devices 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an authorization scope management process 248 for a low-code development environment, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, authorization scope management process 248 may include computer executable instructions that, when executed by processor(s) 220, cause device 200 to perform the techniques described herein. To do so, in some embodiments, authorization scope management process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, authorization scope management process 248 may employ one or more supervised, unsupervised, or semi-supervised machine learning models. Generally, supervised learning entails the use of a training set of data, as noted above, that is used to train the model to apply labels to the input data. For example, the training data may include sample workflow information that has been labeled with various metadata labels. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of a metrics. Semi-supervised learning models take a middle ground approach that uses a greatly reduced set of labeled training data.

Example machine learning techniques that authorization scope management process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

As noted above, recent efforts have focused on simplifying programming environments by representing portions of code in a visual manner. In doing so, programmers no long need to write many lines of code to create a program, but simply need to manipulate a graphical user interface (GUI) to do so. Such programming environments are often referred to as "low-code" development platforms, which incorporate at least some GUI-based functionality in lieu of traditional hand-coded programing. A subset of low-code systems includes "no-code" platforms which are fully graphical in nature. For purposes of the teachings herein, the term "low-code" is intended to be inclusive of "no-code" approaches.

Figure 3:
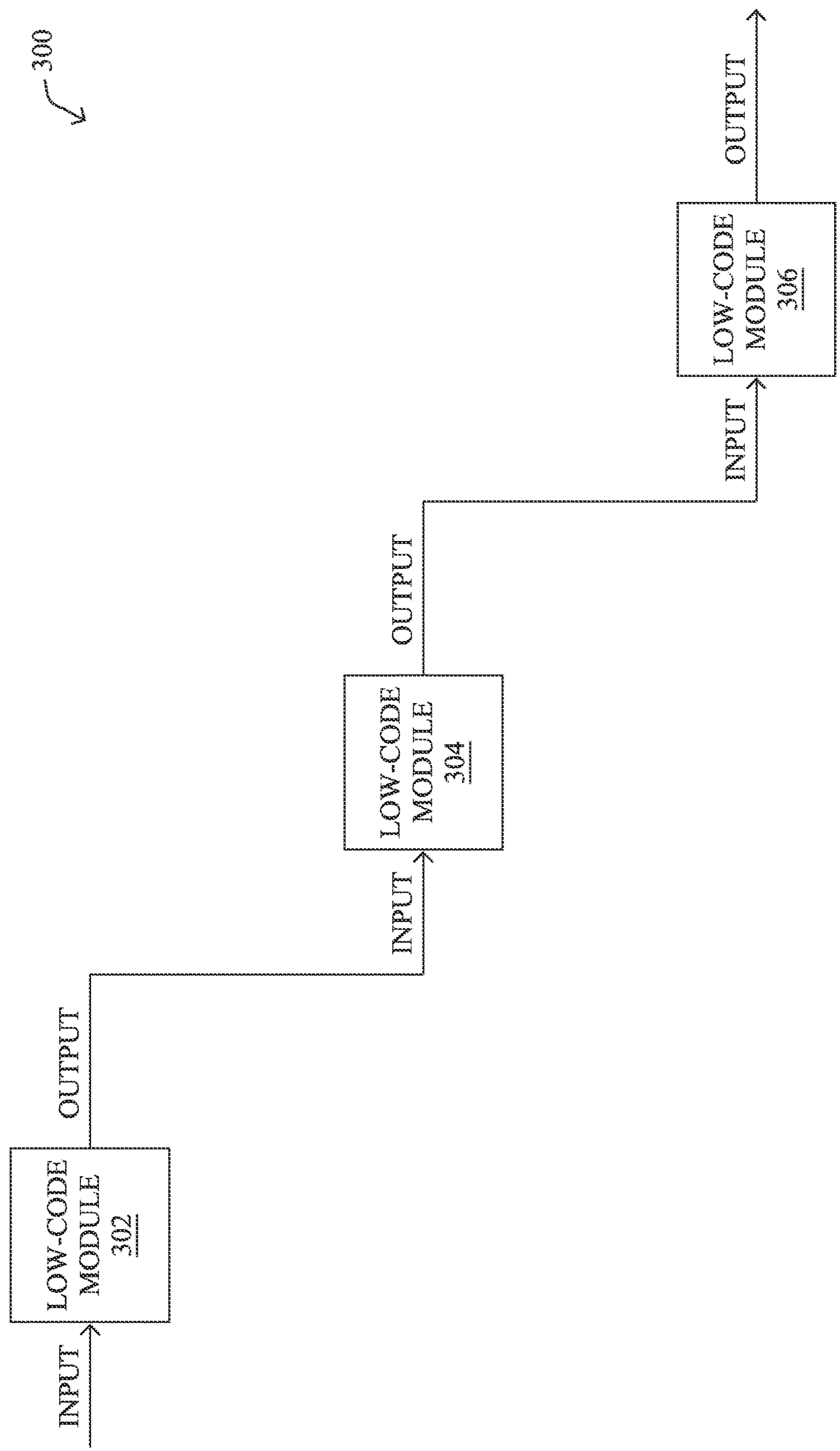
FIG. 3 illustrates an example of the execution of a low-code workflow.

By way of example, FIG. 3 illustrates an example of the execution of a low-code workflow, according to various embodiments. As shown, low-code workflow 300 may include a plurality of modules, such as low-code module 302, low-code module 304, and low-code module 306. Each of these modules 302-306 may comprise different portions of code and may, in various cases, be presented to a user in a graphical manner (e.g., via a drag-and-drop mechanism, etc.). While only three modules 302-306 are shown for purposes of simplicity, an application may include any number of low-code modules, as desired.

As would be appreciated, each of low-code modules 302-306 may input certain data and output certain data, depending on their configurations. Thus, workflow 300 may be created by linking the output of any given module to the input of another given module. For instance, low-code module 304 may take as input the output data from low-code module 302, low-code module 306 may take as input the output data of low-code module 304, etc. This results in a processing workflow between the different modules, as part of the final application.

During execution, each of low-code modules 302-306 may perform one or more actions with respect to a target. Here, each target may be an external tool or environment on which low-code workflow 300 performs the actions of modules 302-306. For instance, a target of low-code workflow 300 may be a cloud hosting service (e.g., Amazon Web Services, Microsoft Azure, etc.), a networking device (e.g., a router, a switch, a firewall, etc.), Domain Name System (DNS) server, or the like.

As noted above, authorization management in low-code environments is typically left to the workflow author/low-code programmer. For instance, assume that low-code module 302 performs a read action with respect to a particular cloud service. In such a case, the author of low-code workflow 300 may create an access key for that cloud service for use by low-code workflow 300 during execution, so that it can perform the action of low-code module 302. However, many low-code targets today lack explicit documentation regarding different authorization scopes. In addition, the very nature of low-code programming environments is that the author of low-code workflow 300 is likely to be a non-technical person having no expertise in optimizing the amount of authorization afforded to low-code workflow 300. Thus, there is the potential for the author of low-code workflow 300 to use access keys that grant low-code workflow 300 more authorization rights with respect to its targets, than are actually necessary. Indeed, from the perspective of the author, unwittingly granting excessive authorization rights to low-code workflow 300 may be acceptable, as the workflow functions.

Authorization Scope Management for Low-Code Programming Environments

The techniques introduced herein enable a low-code programming environment to compare the authorization scopes needed by the actions of a low-code workflow to the authorization scope(s) to be used for the targets of those actions (e.g., services, networking devices, etc.). In some aspects, the techniques herein can be used to ensure that excessive authorizations are not used for the workflow, which could present a security risk over time.

Illustratively, the techniques described herein may be performed by hardware, software, and/or firmware, such as in accordance with the authorization scope management process 248, which may include computer executable instructions executed by the processor 220 (or independent processor of interfaces 210), to perform functions relating to the techniques described herein.

Specifically, according to various embodiments, a device receives a set of actions for a low-code workflow specified via a user interface. The device determines authorization scopes for targets of the set of actions. The device compares the authorization scopes for the targets to authorization scopes needed for the set of actions. The device provides, to the user interface, an excessive authorization notification, when the authorization scopes for the targets exceed the authorization scopes needed for the set of actions.

Figure 4:
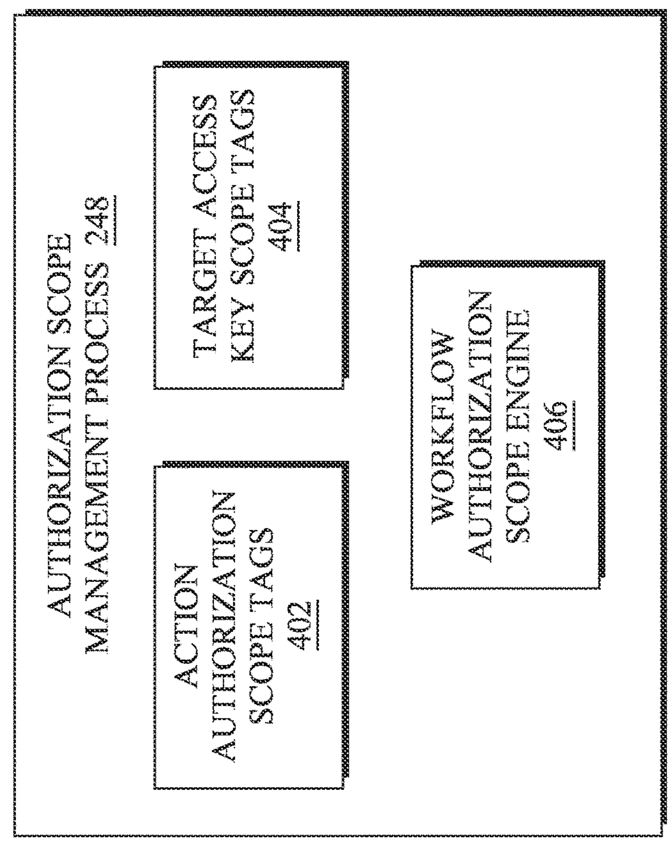
FIG. 4 illustrates an example architecture for authorization scope management in a low-code environment.

Operationally, FIG. 4 illustrates an example architecture for authorization scope management in a low-code environment, according to various embodiments. At the core of architecture 400 is authorization scope management process 248, which may be executed by a specifically configured device, such as a device 200. Typically, authorization scope management process 248 may be implemented in conjunction with a low-code programming utility, either as a co-executed process or implemented directly within the utility itself.

As shown, authorization scope management process 248 may include any or all of the following components: action authorization scope tags 402, target access key scope tags 404, and/or a workflow authorization scope engine 406. As would be appreciated, the functionalities of these components may be combined or omitted, as desired. In addition, these components may be implemented on a singular device or in a distributed manner, in which case the combination of executing devices can be viewed as their own singular device for purposes of executing authorization scope management process 248.

In general, action authorization scope tags 402 may take the form of metadata tags that indicate the authorization(s) required for any given activity of a low—code workflow. For instance, an action authorization scope tag 402 may indicate the target for its associated action, as well as the type of authorization needed, such as authorization to perform a read action, a write action, an administrative action, or the like.

By way of example, assume that a particular workflow action queries the target, Amazon Web Services (AWS) Identity and Access Management (IAM) user policy and modifies AWS S3 bucket policies based on it. In such a case, authorization scope management process 248 may tag this workflow action with action authorization scope tags 402 such as:

AWS:IAM:READ
AWS:S3:ADMIN

Authorization scope management process 248 may also maintain a set of target access key scope tags 404 that take the form of metadata tags that augment information about the target(s) of workflow actions, in some embodiments. In one embodiment, target access key scope tags 404 may augment the target access key schema for capturing details of the authorization scope enabled by a particular access key. For example, if the Target access key allows administrative access to AWS S3, IAM and Route53 then the access key may be tagged with target access key scope tags 404 such as:

AWS:IAM:ADMIN
AWS:S3:ADMIN
AWS:Route53:Admin.

In some embodiments, action authorization scope tags 402 and/or target access key scope tags 404 may be assigned by an administrator of the low-code programming environment, such as when a new authorization key for a target is created or a new low-code module or action is configured. In other embodiments, action authorization scope tags 402 and/or target access key scope tags 404 may be automatically generated or assigned by authorization scope management process 248. To do so, authorization scope management process 248 may employ the use of machine learning, heuristics, predefined rules, combinations thereof, or the like.

A further component of authorization scope management process 248 may be workflow authorization scope engine 406, which is generally responsible for evaluating the overall authorization scope for a created low-code workflow. In some embodiments, workflow authorization scope engine 406 may also be configured to assist in consolidating the authorization scope provided by target access key(s) for the target(s) of those actions.

As would be appreciated, three different outcomes are possible with respect to the analysis by workflow authorization scope engine 406:

1. Equilibrium state—this is the optimal state in which the aggregated authorization scopes provided by the target access key(s) are equal to the required aggregated authorization scope of the actions of the low-code workflow.
2. Excessive authorization—this state represents the situation in which the authorization scopes provided by the target access key(s) exceed the aggregate authorization scope of the actions of the low-code workflow. This situation is generally undesirable, as it means that the low-code workflow has more privileges than it actually needs, presenting a potential security issue over time.
3. Insufficient authorization—this state represents the converse of the excessive authorization state whereby the degree of authorization needed to perform the actions of the low-code workflow exceeds that afforded by the target access key(s) of the workflow.

Depending on which condition exists, workflow authorization scope engine 406 may initiate any number of different corrective measures. For instance, in the case of excessive authorization, workflow authorization scope engine 406 may provide an excessive authorization notification to the user attempting to create or modify the low-code workflow, in various embodiments. This notification may prompt the workflow author to reduce the target authorization scope(s) for the workflow. In another embodiment, workflow authorization scope engine 406 may disable the low-code workflow from being executed, until the excessive authorization condition is rectified. In a further embodiment, workflow authorization scope engine 406 may take automated corrective measures, such as by generating a new target access key that is reduced in privileges compared to that of the original target access key.

In cases in which an insufficient authorization condition exists, workflow authorization scope engine 406 may likewise send a notification to the user interface of the workflow author, indicating the presence of this condition. Such a notification may, in some embodiments, also indicate the action authorization scope tags 402 for the workflow. Doing so allows the workflow author to assign an access key with the authorization scope needed by the workflow. In another embodiment, workflow authorization scope engine 406 may automate this corrective process, when an insufficient authorization condition exists, provided the workflow author has sufficient privileges to do so.

In the case of an equilibrium condition, workflow authorization scope engine 406 may still provide a notification to the user interface of the workflow author, indicating that the authorization scopes are ideal.

Figure 5:
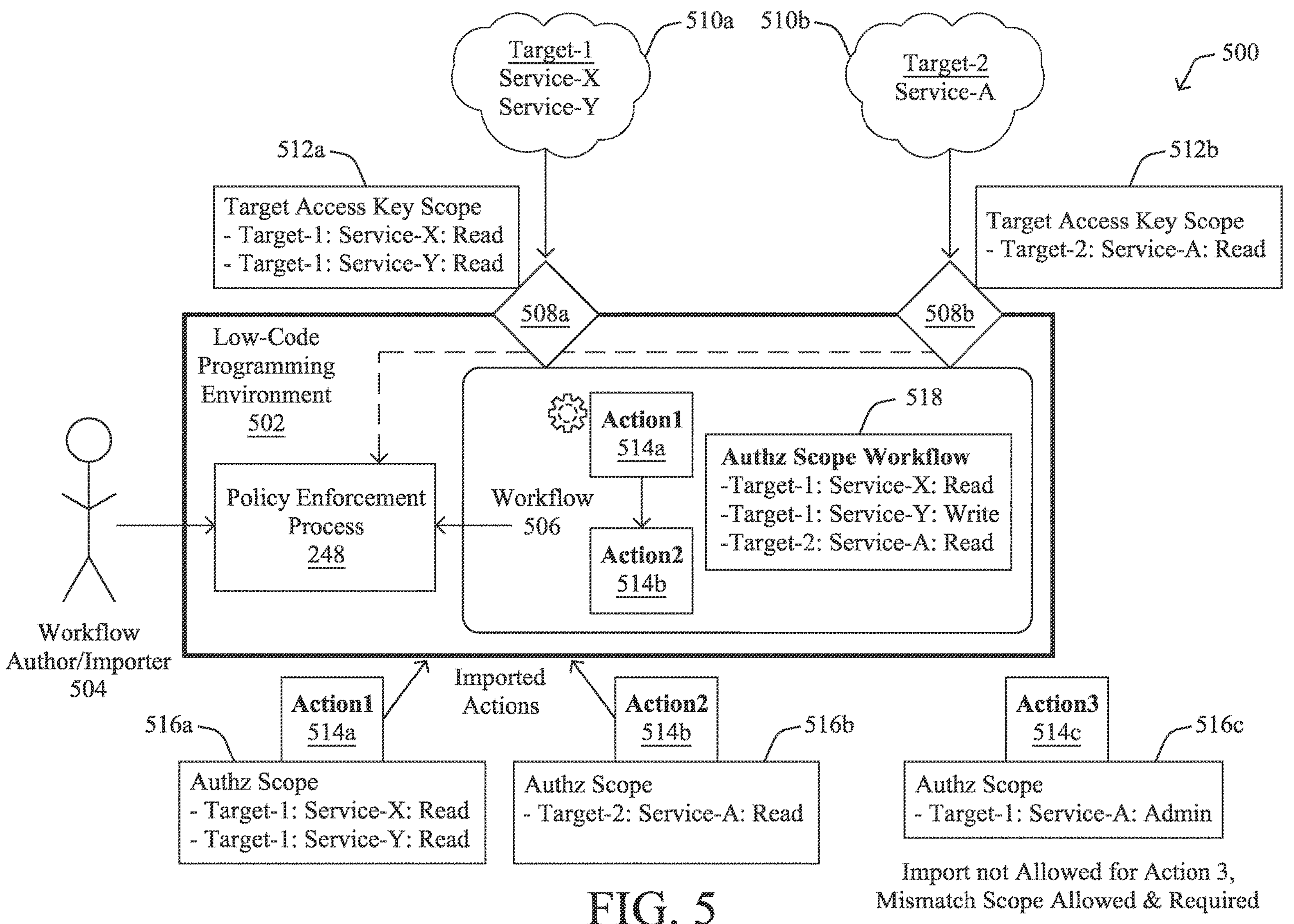
FIG. 5 illustrates an example of authorization scope management being used to identify an authorization mismatch for a low-code workflow.

FIG. 5 illustrates an example 500 of authorization scope management being used to identify an authorization mismatch for a low-code workflow, according to various embodiments. As shown, assume that there is a low-code programming environment 502 of which authorization scope management process 248 is a component.

During use of low-code programming environment 502, a workflow author/importer 504 may attempt define a workflow 506 by importing three different modules/actions into it: a first action 514*a*, a second action 514*b*, and a third action 514*c*. While workflow author/importer 504 may typically be a person that is not specifically trained as a traditional programmer, the techniques herein are not limited as such and could also be a highly skilled expert programmer.

Each of actions 514*a*-514*c* may have its own associated authorization scope, as indicated by action authorization scope tags 516*a*-516*c*, respectively.

More specifically, authorization scope tag 516*a* may take the following form:

Target-1: Service-X: Read

Target-1: Service-Y: Read

This indicates that action 514*a* entails workflow 506 performing a read operation on two services (Service-X and Service-Y) of a particular target, Target-1, denoted as target 510*a* in FIG. 5.

Similarly, authorization scope tag 516*b* may take the following form, indicating that action 514*b* entails workflow 506 performing a read operation on a single service of a second target, Target-2, denoted as target 510*b*:

Target-2: Service-A: Read

Finally, authorization scope tag 516*c* may take the following form, indicating that its associated action 514*c* entails workflow 506 performing an administrative action with respect to a third service of Target-1, Service-A:

Target-1: Service-A: Admin

By maintaining a mapping of authorization scope tags 516 for actions 514, authorization scope management process 248 is able to discern the aggregated authorization scope needed by the actions of workflow 506.

Assume now that workflow author/importer 504 creates access keys 508*a*-508*b* for targets 510*a*-510*b*, to allow workflow 506 to be executed. Typically, this may be done according to their user role, such as a ‘workflow author role.’ In various embodiments, authorization scope management process 248 may associate target access key scope tags 512*a*-512*b* to access keys 508*a*-508*b*, indicating their respective levels of permission with targets 510*a*-510*b*. Here, target access key scope tag 512*a* may take the following form:

Target-1: Service-X: Read

Target-1: Service-Y: Read

This indicates that access key 508*a* can be used to perform read operations with respect to services X and Y of target 510*a*.

Similarly, target access key scope tag 512*b* may indicate that access key 508*b* can be used to perform a read operation with respect to service A of target 510*b*.

According to various embodiments, authorization scope management process 248 may compare action authorization scope tags 516*a*-516*c* to target access key scope tags 512*a*-512*b*, to determine the authorization state of workflow 506. Here, actions 514*a*-514*b* may be authorized, in view of access keys 508*a*-508*b*, and authorization scope management process 248 may allow these actions to be added to workflow 506. However, neither of access keys 512*a*-512*b* allow workflow 506 to perform action 514*c*.

In other words, the authorization scope needed by action 514*c* falls outside of the aggregate authorization scope 518 provided by access keys 508*a*-508*b*. In such a case, authorization scope management process 248 may prevent action 514*c* from being added to workflow 506 and/or disabling workflow 506 from being executed, until the authorization scope mismatch is fixed. In addition, authorization scope management process 248 may send a notification back to the user interface operated by workflow author/importer 504 indicative of the detected insufficient authorization condition.

Figure 6:
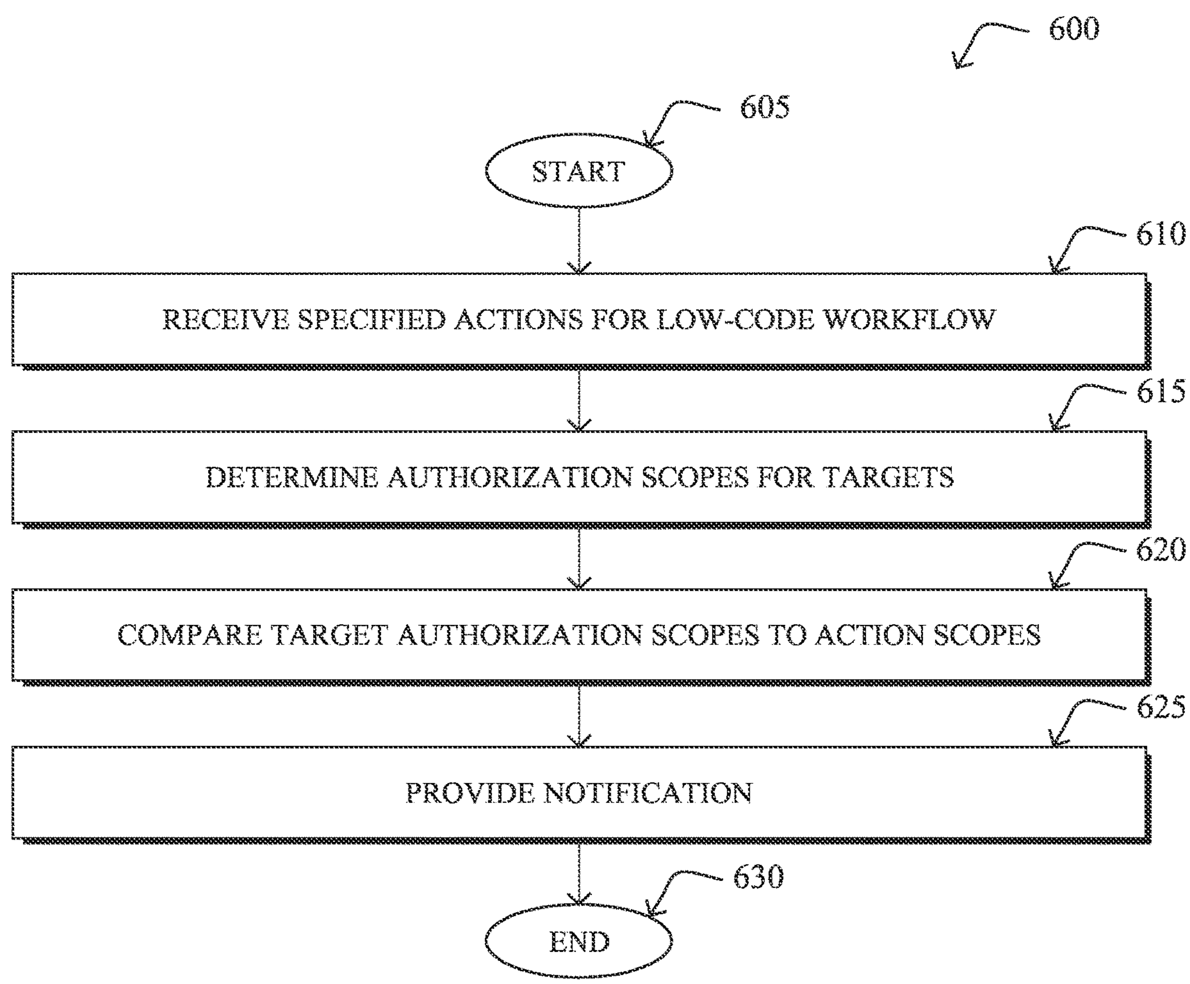
FIG. 6 illustrates an example simplified procedure for managing authorization scopes for a low-code programming environment.

FIG. 6 illustrates an example simplified procedure (e.g., a method) for managing authorization scopes for a low-code programming environment, in accordance with one or more embodiments described herein. For example, a non-generic, specifically configured device (e.g., device 200) may perform procedure 600 by executing stored instructions (e.g., authorization scope management process 248). The procedure 600 may start at step 605, and continues to step 610, where, as described in greater detail above, the device may receive a set of actions for a low-code workflow specified via a user interface. For instance, such actions may take the form of a read action, a write action, an administrative action, or the like, with respect to one or more targets. In various embodiments, the target(s) for the specified workflow actions may comprise different online services, a networking device, a DNS server, combinations thereof, of the like.

At step 615, as detailed above, the device may determine authorization scopes for the targets of the set of actions. In various embodiments, the device may do so by identifying one or more authorization keys associated with a user of the user interface for the targets. For instance, the device may receive, via the user interface, the one or more authorization keys for the targets during specification of the low-code workflow by the user. In addition, the device may associate authorization scope tags with the targets, based on the one or more authorization keys.

At step 620, the device may compare the authorization scopes for the targets to authorization scopes needed for the set of actions, as described in greater detail above. In some embodiments, the device may do so by maintaining a set of authorization scope tags associated with the set of actions that indicate their authorization scopes. In turn, the device may aggregate the authorization scope tags for the actions and for the targets, and compare the aggregated tags to one another. Depending on the outcome, this may indicate an equilibrium state, a excessive authorization state, or an insufficient authorization state for the low-code workflow.

At step 625, as detailed above, the device may provide, to the user interface, an excessive authorization notification, when the authorization scopes for the targets exceed the authorization scopes needed for the set of actions. Such a notification may indicate that the low-code workflow is authorized to perform more actions with its targets than are actually needed. In one embodiment, the device may also disable the low-code workflow, when this condition exists. In yet another embodiment, the device may provide the excessive authorization notification in conjunction with any automated corrective measures taken by the device, such as by generating a new, more restrictive access key for use by the workflow. In another embodiment, the device may likewise disable the low-code workflow, when the authorization scopes for the targets exceed the authorization scopes needed for the set of actions. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, allow for the achievement of an equilibrium state with respect to the authorization scopes needed by a low-code workflow and the authorization scopes actually assigned to the workflow. This allows for the identification of potential security issues, as well as conditions that can impinge on the operation of the low-code workflow during execution.

While there have been shown and described illustrative embodiments that provide for policy enforcement in low-code environments, it is to be understood that various other adaptations and modifications may be made within the spirit and scope of the embodiments herein. For example, while certain embodiments are described herein primarily with respect to a visual programming environment, the techniques can be extended without undue experimentation to other programming or configuration environments, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

receiving, at a device, a set of actions to be performed on one or more targets for a low-code workflow specified via a user interface;

determining, by the device, authorization scopes for the set of actions by associating authorization scope tags with the set of actions and by associating each of the one or more targets with one or more access keys that are associated with access key scope tags, wherein the authorization scope tags are indicative of a type of authorization associated with a first action at a first target of the one or more targets, further wherein the access keyscope tags are associated with a second action at a second target of the one or more targets;

comparing, by the device, the authorization scope tags to the access key scope tags for the one or more targets; and providing, by the device and to the user interface, an excessive authorization notification, when the access key scope tags for the targets exceed the authorization scope tags for the set of actions.

2. The method as in claim 1, wherein the targets of the set of actions comprise different online services.

3. The method as in claim 1, wherein determining the access key scope tags for the targets comprises:

identifying one or more access keys associated with a user of the user interface for the targets.

4. The method as in claim 3, further comprising:

receiving, at the device and via the user interface, the one or more access keys for the targets during specification of the low-code workflow by the user.

5. The method as in claim 1, further comprising:

disabling, by the device, the low-code workflow, when the authorization scope tags for the set of actions exceed the access key scope tags for the targets.

6. The method as in claim 1, wherein the set of actions comprise at least one of: a read action, a write action, or an administrative action.

7. The method as in claim 1, further comprising:

disabling, by the device, the low-code workflow, when the access key scope tags for the targets exceed the authorization scope tags for the set of actions.

8. The method as in claim 1, further comprising:

maintaining a set of authorization scope tags associated with the set of actions that indicate their authorization scopes.

9. The method as in claim 1, wherein the targets comprise at least one of: a networking device or a Domain Name System (DNS) server.

10. An apparatus, comprising:

one or more network interfaces;

a processor coupled to the one or more network interfaces and configured to execute one or more processes; and a memory configured to store a process that is executable by the processor, the process when executed configured to:

receive a set of actions to be performed on one or more targets for a low-code workflow specified via a user interface;

determine authorization scopes for the set of actions by associating authorization scope tags with the set of actions and by associating each of the one or more targets with one or more access keys that are associated with access key scope tags, wherein the authorization scope tags are indicative of a type of authorization associated with a first action at a first target of the one or more targets, further wherein the access keyscope tags are associated with a second action at a second target of the one or more targets;

compare the authorization scope tags to the access key-scope tags for the one or more targets; and provide, to the user interface, an excessive authorization notification, when the access key scope tags for the targets exceed the authorization scope tags for the set of actions.

11. The apparatus as in claim 10, wherein the targets of the set of actions comprise different online services.

12. The apparatus as in claim 10, wherein the apparatus determines the access key scope tags for the targets comprises:

identifying one or more access keys associated with a user of the user interface for the targets.

13. The apparatus as in claim 12, wherein the process when executed is further configured to:

receive, via the user interface, the one or more access keys for the targets during specification of the low-code workflow by the user.

14. The apparatus as in claim 10, wherein the process when executed is further configured to:

disable the low-code workflow, when the authorization scope tags for the set of actions exceed the access key scope tags for the targets.

15. The apparatus as in claim 10, wherein the set of actions comprise at least one of: a read action, a write action, or an administrative action.

16. The apparatus as in claim 10, wherein the process when executed is further configured to:

disable the low-code workflow, when the access key scope tags for the targets exceed the authorization scope tags for the set of actions.

17. The apparatus as in claim 10, wherein the process when executed is further configured to:

maintain a set of authorization scope tags associated with the set of actions that indicate their authorization scopes.

18. A tangible, non-transitory, computer-readable medium storing program instructions that cause a device to execute a process comprising:

receiving, at a device, a set of actions to be performed on one or more targets for a low-code workflow specified via a user interface;

determining, by the device, authorization scopes for the set of actions by associating authorization scope tags with the set of actions and by associating each of the one or more targets with one or more access keys that are associated with access key scope tags, wherein the authorization scope tags are indicative of a type of authorization associated with a first action at a first target of the one or more targets, further wherein the access keyscope tags are associated with a second action at a second target of the one or more targets;

comparing, by the device, the authorization scope tags to the access key scope tags for the one or more targets; and providing, by the device and to the user interface, an excessive authorization notification, when the access key scope tags for the targets exceed the authorization scope tags for the set of actions.

* * * * *